(12) United States Patent
Dziurda et al.

(10) Patent No.: US 9,828,893 B2
(45) Date of Patent: Nov. 28, 2017

(54) SOUND CONTROL OF AN ENGINE OR OTHER PRIME MOVER

(71) Applicant: GM GLOBAL TECHNOLOGY OPERATIONS LLC, Detroit, MI (US)

(72) Inventors: Robert A. Dziurda, Waterford, MI (US); Anthony A. Bosco, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 44 days.

(21) Appl. No.: 15/056,197

(22) Filed: Feb. 29, 2016

(65) Prior Publication Data

US 2017/0248048 A1     Aug. 31, 2017

(51) Int. Cl.
| | |
|---|---|
| *G06F 19/00* | (2011.01) |
| *B60K 6/48* | (2007.10) |
| *F01N 1/16* | (2006.01) |
| *G01S 19/14* | (2010.01) |
| *G10K 11/18* | (2006.01) |
| *F01N 13/08* | (2010.01) |

(52) U.S. Cl.
CPC .......... *F01N 1/165* (2013.01); *F01N 13/082* (2013.01); *G01S 19/14* (2013.01); *G10K 11/18* (2013.01)

(58) Field of Classification Search
CPC .................................. G06F 19/00; B60K 6/48
USPC .......................... 701/22; 903/902; 180/65.21
See application file for complete search history.

(56) References Cited

U.S. PATENT DOCUMENTS

| | | | | |
|---|---|---|---|---|
| 2005/0175186 A1* | 8/2005 | Yasushi | ................. | B60Q 5/008 381/61 |
| 2005/0200462 A1* | 9/2005 | Maekawa | ............. | B60Q 5/008 340/435 |
| 2009/0096811 A1* | 4/2009 | Tanaka | ............... | G02B 27/0101 345/629 |
| 2011/0093149 A1* | 4/2011 | Tanaka | .................. | B60Q 5/008 701/22 |
| 2011/0240146 A1* | 10/2011 | Kawasaki | ............ | B60W 10/30 137/487.5 |

* cited by examiner

*Primary Examiner* — Thomas G Black
*Assistant Examiner* — Wae L Louie
(74) *Attorney, Agent, or Firm* — Quinn IP Law

(57) ABSTRACT

A system for controlling a sound level of a prime mover permitted to emanate from or within a vehicle includes a global positioning satellite (GPS) receiver operable for receiving a GPS signal and a sound control device. The sound control device is operable for increasing or decreasing a sound level of the prime mover in response to a control signal. A controller in communication with the GPS receiver includes a calendar and clock, and is programmed to execute a method, including receiving the GPS signal via the GPS receiver, and determining an actual location of the vehicle using the GPS signal. The controller also determines an actual date and time of day using the calendar and the clock, respectively, and transmits the control signal to the sound control device to increase or decrease the sound level using at least one of the actual location, date, and time of day.

19 Claims, 4 Drawing Sheets

SOUND CONTROL OF AN ENGINE OR OTHER PRIME MOVER

TECHNICAL FIELD

The present disclosure relates to a system and method for controlling a sound level emanated by an engine or other prime mover.

BACKGROUND

Internal combustion engines and electric motors generate torque, and are therefore used as prime movers in vehicles and other mobile or stationary systems. Engines in particular convert chemical energy of a supply of gasoline or another combustible fuel into mechanical motion. In a typical gasoline engine, a reciprocating piston is connected to a crankshaft via a connecting rod. As an intake valve to a given engine cylinder opens during an intake stroke, the piston moves in such a way as to admit a mixture of air and fuel into the cylinder. The fuel/air mixture is then compressed within the cylinder by movement of the piston. A spark ignites the compressed mixture to drive the piston to a bottom stroke position, at which point a cylinder exhaust valve opens to allow post-combustion exhaust gasses to exit the cylinder. The exhaust gasses are ultimately discharged to the surrounding atmosphere via a tailpipe assembly. Compared to the low levels of sound typically emitted by an electric machine, the combustion process can generate substantial amounts of engine noise.

SUMMARY

A system and method are disclosed herein for controlling an emanated sound level of an internal combustion engine or other prime mover, i.e., an amount or level of sound from the prime mover that is permitted to emanate from and/or within a vehicle. The present approach considers the actual location and/or date/time in the control of one or more sound control devices, each of which is operable for increasing or decreasing the sound level emanating inside and/or outside of the vehicle depending on the embodiment. For instance, the sound control device may be embodied as an exhaust nozzle assembly having a moveable flapper door with open and closed positions. The open/closed positions are selectable via a controller so as to increase or decrease the emanated sound level according to user preferences. Alternatively, the sound control device may include a speaker system operable for broadcasting an audio signal into a vehicle interior, with the audio signal being representative of a sound of the prime mover or of any other predetermined sound. In still other embodiments, exterior sound may be generated and broadcast, for example by broadcasting a representative vehicle sound for pedestrian alerts.

The system may include a global positioning satellite (GPS) receiver operable for receiving a GPS signal. The controller, which includes a clock and calendar, is programmed to receive the GPS signal via the GPS receiver, determine an actual location of the vehicle using the GPS signal and an actual date and time of day using the calendar and clock, respectively. The controller then transmits a control signal to the sound control device(s) to thereby increase or decrease the emanated sound level from the prime mover in a manner that is dependent upon the actual location or date/time of day, and/or on other communication signals depending on the embodiment.

A method is also disclosed for controlling an emanated sound level from a prime mover in a vehicle. The method includes receiving a GPS signal via a controller using a GPS receiver, and then determining an actual location of the vehicle using the GPS signal. The method also includes determining an actual date and time of day using a calendar and a clock of the controller, and increasing or decreasing the sound level permitted to emanate from or within the vehicle using at least one of the actual location, date, and time of day. This occurs by transmitting a control signal to a sound control device, with the sound control device operable for selectively increasing or decreasing a sound level of the prime mover in response to the control signal.

The above features and advantages and other features and advantages will be readily apparent from the following detailed description when taken in connection with the accompanying drawings.

BRIEF DESCRIPTION OF THE DRAWINGS

FIG. 2A is a schematic perspective view illustration of a flapper door and motor assembly usable as part of the example sound control system shown in FIG. 2.

DETAILED DESCRIPTION

Figure 1:
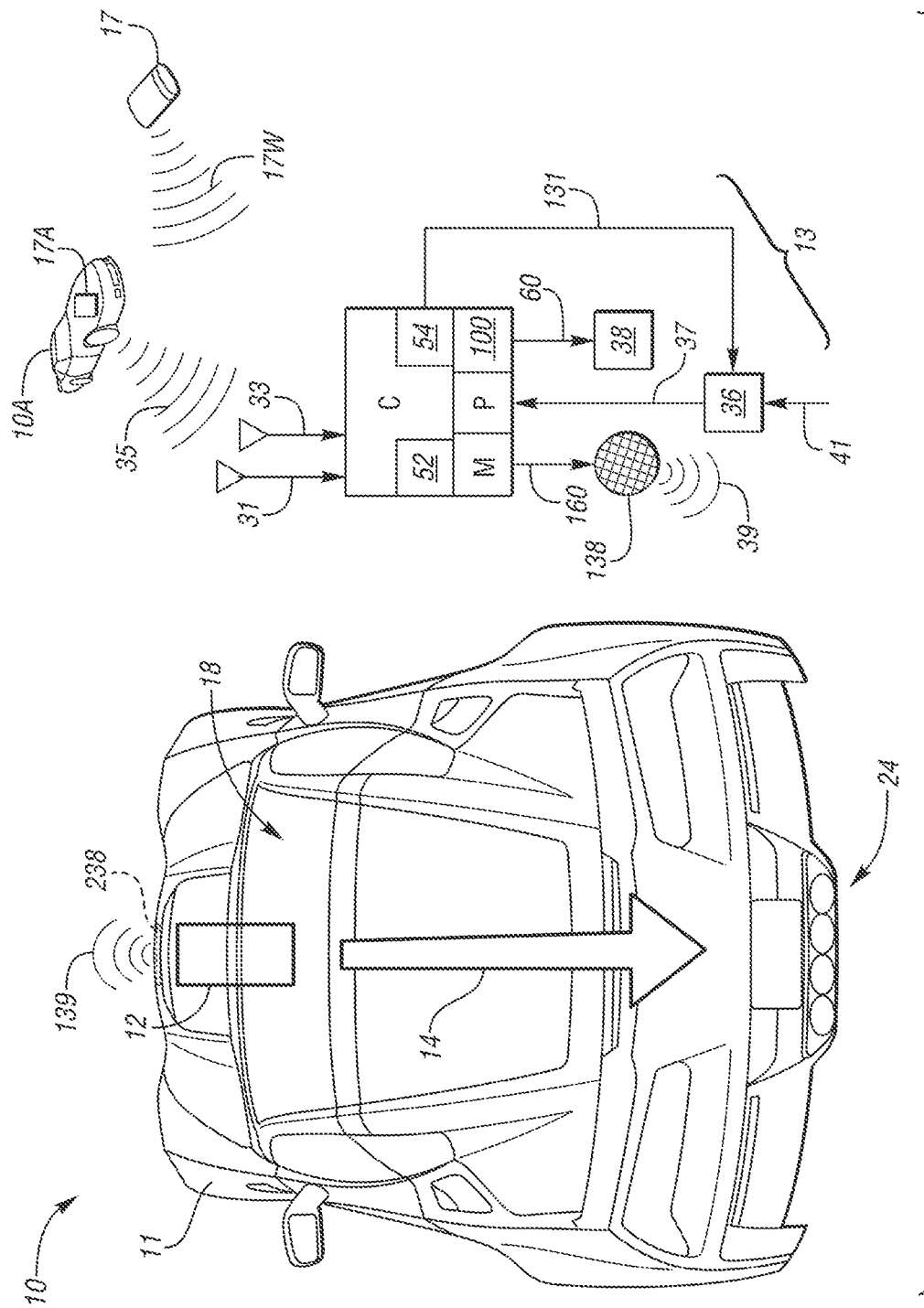
FIG. 1 is a schematic illustration of a vehicle having a prime mover and a system operable for controlling sound from the prime mover using a methodology as set forth herein.

Referring to the drawings, wherein like reference numbers refer to like components throughout the several views, a vehicle 10 is shown in FIG. 1 that includes a vehicle body 11 defining an interior 18. The vehicle 10 also includes a prime mover 12 that emits sound during its operation. The prime mover 12 may be an internal combustion engine, e.g., a gas or diesel engine, or an electric machine in different embodiments. The vehicle 10 may be a high-performance passenger vehicle as shown, whether a sedan, coupe, truck, or crossover vehicle, or the vehicle 10 may be embodied as any other type of mobile platform using the prime mover 12 as a source of torque, and emitting sound whose volume it may be desirable to control. It is also possible for the present approach to be adapted for use in stationary systems such as power plants as explained below. For illustrative consistency, the disclosure will pertain to use in the vehicle 10 of FIG. 1 without limiting applications to such an embodiment.

As set forth herein with additional reference to FIGS. 2-5, the vehicle 10 is equipped with a system 13 that is operable, via execution of computer-readable instructions embodying a method 100 as described below with reference to FIG. 4, for controlling a level of sound from the prime mover 12 as emanated from and/or within the vehicle 10, specifically via adaptive control of one or more sound control devices 38, 138, and/or 238, each of which is operable for increasing or decreasing a sound level inside or outside of the vehicle body 11.

Using the approach described herein, users of high-performance vehicles such as the example vehicle 10 of FIG. 1, or other mobile or stationary platforms having the prime mover 12, can define periods of relative quiet based on the actual location of the vehicle 10 and the actual date/time of day. For instance, the controller 50 can automatically reduce perceived noise levels of the prime mover 12 outside and/or inside of the vehicle 10 as the vehicle 10 passes a hospital, church, school, cemetery, or other designated location. Also addressed herein is the problem of loud start-ups of certain types of vehicles, which may not be desirable at certain times such as very early in the morning in residential neighborhoods.

Figure 2:
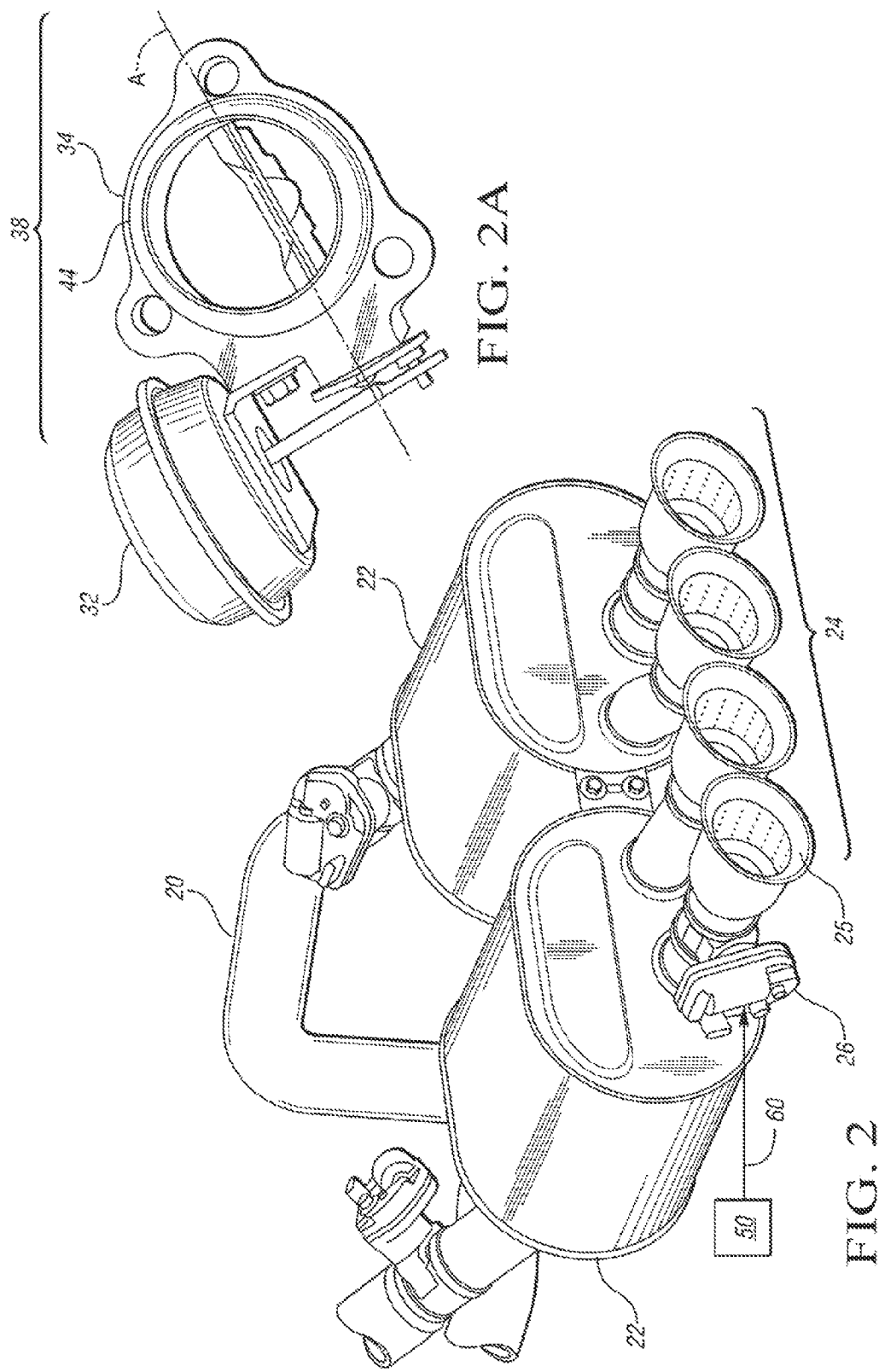
FIG. 2 is a schematic perspective view illustration of an example sound control system usable as part of the vehicle depicted in FIG. 1.

The sound control device 38 may include an exhaust nozzle assembly 24 as shown schematically in FIGS. 2 and 2A, e.g., having a flapper door 34 with selectable open and closed positions that respectively increase or decrease the sound level of the prime mover 12 outside of the vehicle 10. Such an embodiment may be useful when the prime mover 12 is an internal combustion engine or otherwise generates substantial levels of sound in operation. The sound control device 138 or 238, which may be used alone or in conjunction with the sound control device 38, may include a speaker system operable for broadcasting an audio signal 39 or 139 into an interior 18 of the vehicle 10 or outside of the vehicle 10, respectively. The audio signals 39 and 139 may be representative of an amplified actual or simulated engine noise, motor noise, or sound effect depending on the embodiment.

Other embodiments of the sound control devices 38 and 138 may be used within the scope of the disclosure as set forth below, including those used for selectively providing sound control in electric or hybrid drive modes in which the prime mover 12 is configured as a traction motor. For instance, the sound control device 138 may be positioned at the front of the vehicle 10 and configured for broadcasting the audio signals 139 outside of the vehicle 10, e.g., as a representative electric motor, engine, or other sound. Such control may occur at lower speeds, particularly when the vehicle 10 is an electric vehicle whose operation at such speeds is relatively quiet. In this manner, the sound control device 138 may be configured to generate sufficient noise for the purposes of providing a suitable pedestrian alert.

The system 13 of FIG. 1 may include a global positioning satellite (GPS) receiver 31 that is operable for receiving a GPS signal (not shown), as well as a controller (C) 50 that is in communication with the GPS receiver 31. The controller 50, which includes a clock 52 and calendar 54 providing an actual date and time of day, respectively, is programmed to receive the GPS signal from a GPS satellite via the GPS receiver 31 in the conventional manner. The controller 50 is also programmed to determine an actual location of the vehicle 10 using the GPS signal and an actual date/time of day from the clock 52 and calendar 54. Using sound preferences (arrow 41) selected by a user of the vehicle 10, the controller 50 transmits a control signal (arrow 60s, 160) to the sound control device(s) 38 and/or 138, respectively, to thereby selectively increase or decrease a sound level as emanated downstream of the prime mover 12 in a manner that is dependent upon the actual location, date, and/or time of day, and possibly other signals as set forth below.

In an example embodiment, the prime mover 12 may be configured as an internal combustion engine that generates an exhaust flow (arrow 14) as a product of fuel/air combustion. The exhaust flow (arrow 14) is conducted through a length of exhaust pipe (not shown) and ultimately discharged to the ambient via the exhaust nozzle assembly 24. The vehicle 10 may be configured as a high-performance vehicle, truck, or work vehicle, in which case the sound level emitted by the prime mover 12 may be relatively high. In such embodiments, the exhaust nozzle assembly 24 may be equipped with the sound control device 38, which will now be described with reference to FIGS. 2 and 2A.

Some nozzles 25 of the exhaust nozzle assembly 24 may be equipped with the sound control device 38 of FIG. 2A, e.g., the flapper door 34 disposed within a flange 44 within a given one of the nozzles 25. A solenoid 32 may be connected to the flapper door 34. In response to the control signal (arrow 60) from the controller 50, the solenoid 32 or other suitable drive mechanism can rotate the flapper door 34 about an axis of rotation A to a desired position, with a fully-open position depicted in FIG. 2A.

The prime mover 12 of FIG. 1, when configured as an engine, may be connected to a pair of mufflers 22 via a length of exhaust pipe 20, only a portion of which is shown in FIG. 2. The solenoid 32 of FIG. 2A may be contained in a motor housing 26 that is fastened adjacent to the nozzles 25 as shown in FIG. 2. Control of the flapper door 34 disposed within one of the nozzles 25 functions as an exhaust valve by selectively allowing some or none of the exhaust flow (arrow 14 of FIG. 1) to bypass the mufflers 22, with the degree of bypass and sound level determined by the commanded open/closed position of the flapper door 34. When the muffler(s) 22 are bypassed, the sound level of the prime mover 12 is increased outside of the vehicle 10 of FIG. 1, thereby providing a more open or "full throated" emanated sound typical of high-performance engines. Likewise, closing the flapper door 34 effectively directs all of the exhaust flow (arrow 14) through the mufflers 22 for quieter operation.

Referring again to FIG. 1, the controller 50 may include a human machine interface (HMI) device 36 operable for receiving a sound preference (arrow 41) as an input signal, and generating the control signal (arrow 60) in response to the sound preference (arrow 41). The controller 50 may be programmed to compare a user-selected location and date/time of day to the actual location and date/time of day, with the actual location, date, and time determined respectively by the GP receiver 31, the calendar 54, and the clock 52, and to transmit the control signal (arrow 60) to the sound control device 38 and/or 138 only when the sound preference (arrow 41) matches the actual location or the user-selected date/time of day matches the actual date/time of day. In this manner, a user of the vehicle 10 is able to tailor the sound performance of the prime mover 12 to the user's own circumstances and driving preferences.

For instance, the controller 50 of FIG. 1 may be programmed to detect predetermined points of interest on a geocoded map 131 (also see FIG. 3), such as a typical navigation map displayed via the HMI device 36. The controller 50 can then automatically decrease the sound level of the prime mover 12 inside or outside of the vehicle 10 at different times of day, and/or on different dates or days of the week, when the actual location of the vehicle 10 is within a calibrated range of any of the predetermined points of interest on the map 131. Non-limiting example predetermined points of interest may include schools, churches, hospitals, nursing homes, other health care or facilities, cemeteries, and residential neighborhoods.

Figure 3:
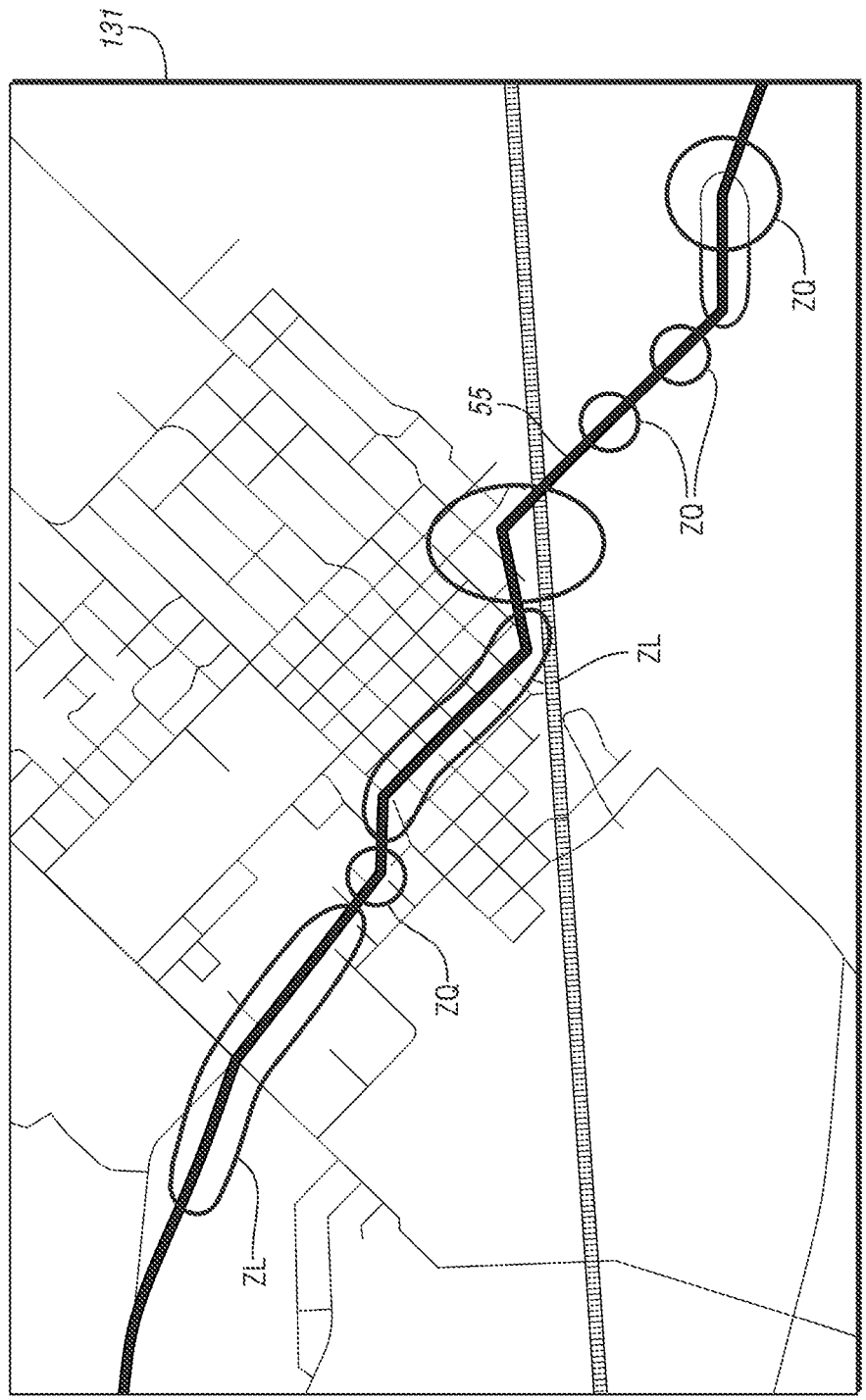
FIG. 3 is a schematic illustration of a map with designated sound control zones that may be used in some embodiments of the system shown in FIG. 1.
Figure 5:
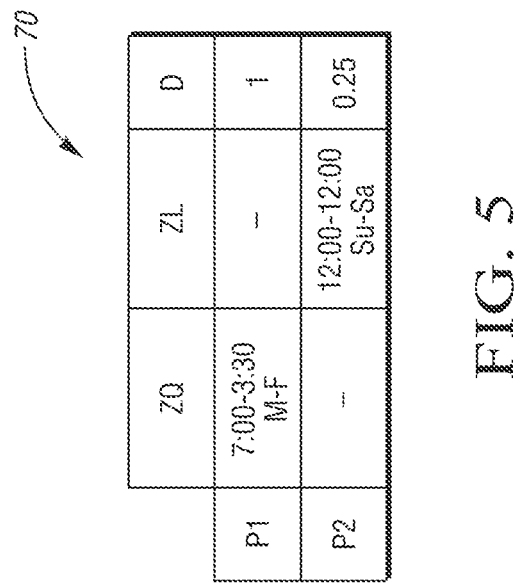
FIG. 5 is a data table describing a simplified example embodiment having two points of interest and corresponding user preferences.

Referring to FIG. 3, the map 131 noted above is shown as a schematic example map having a stretch of highway 55 and various predetermined points of interest $P_X$ of the example types noted above. An operator of the vehicle 10 of FIG. 1 may touch the HMI device 36, e.g., a touch-sensitive screen of the type usually found in a vehicle or a cell phone- or tablet-based navigation system, to designate a quiet zone ($Z_Q$) or a loud zone ($Z_L$) with respect to the various predetermined points of interest ($P_X$). Another embodiment includes the use of a two-dimensional (2D) lookup table 70, as shown in FIG. 5 and described below, that is populated by an occupant using the HMI device 36, by accessing a web site, or via an application or "app" accessed via a cell phone, tablet, or other portable device. The controller 50 may be programmed to detect a predetermined point of interest ($P_X$) on the map 131 via the GPS receiver 31, and to automatically decrease the sound level of the prime mover 12 when the actual location of the vehicle 10 is within a calibrated range or distance of a given one of the predetermined points of interest ($P_X$).

As an example configuration, a user of the vehicle 10 may designate the hours of 10 pm-10 am as being "quiet hours" for designated points of interest ($P_X$), such as within one mile of the user's house, a school, a church, a place of business, or any other designated point of interest ($P_X$). The user may designate all stretches of the highway 55 not within a predetermined proximity of a designated point of interest ($P_X$) as being a designated loud zone ($Z_L$). For vehicles 10 configured with the example sound control devices 38 and 138 described above, i.e., operable for controlling sound levels both inside and outside of the vehicle interior 18 of FIG. 1, the user may maintain a higher sound level inside of the vehicle interior 18 in conjunction with a reduced sound level external to the vehicle interior 18, e.g., by playing sound files through the sound control device 138 while maintaining the flapper doors 34 of FIG. 2A in a closed position. The same user may wish to reduce distractions by maintaining a quiet sound level in the interior 18, for instance while driving in school zones or congested traffic areas, or when operating the vehicle 10 under certain conditions such as while talking on a cell phone or in inclement weather, possibly in conjunction with maintaining increased sound levels outside of the vehicle 10.

To implement optional features of the method 100, the controller 50 of FIG. 1 may include an additional receiver 33 that is operable for receiving a communication signal 35 or 17W from a remote device 17 or 17A, respectively, e.g., a cell phone or a wireless identification device that emits Bluetooth or Wi-Fi signals for short or medium range wireless communication. The controller 50 may be further programmed to temporarily modify and transmit the control signal (arrows 60, 160) in response to receipt of the communication signals 35 and/or 17W.

By way of an example, the controller 50 may be programmed to automatically decrease the sound level via the control signals (arrows 60, 160) of FIG. 1 whenever the user is talking on a cell phone while seated within the vehicle interior 18. The remote device 17 or 17A may be alternatively embodied as or include a radio frequency (RF) transmitter operable for transmitting a wireless identification signal as the communication signal 35, e.g., a unique bit string, with the controller 50 programmed to increase the sound level of the prime mover 12 when such an identification signal matches a predetermined identification signal.

By way of example, another high-performance vehicle 10A having the remote device 17A may broadcast a unique RF signal indicative of the make or model of the vehicle 10A. In a particular mode, e.g., a "peacock" or "show" mode, the vehicle 10 can respond to the detection of the vehicle 10A by increasing the sound level of the prime mover 12 emitted outside of the vehicle 10, for instance by rotating the flapper door 34 of FIG. 2A to a fully open position to partially bypass the mufflers 22 of FIG. 2. Likewise, the same control actions may be provided when passing certain predetermined points of interest such as vehicle dealerships, racetracks, or other locations at which the user wishes to increase external sound levels.

Figure 4:
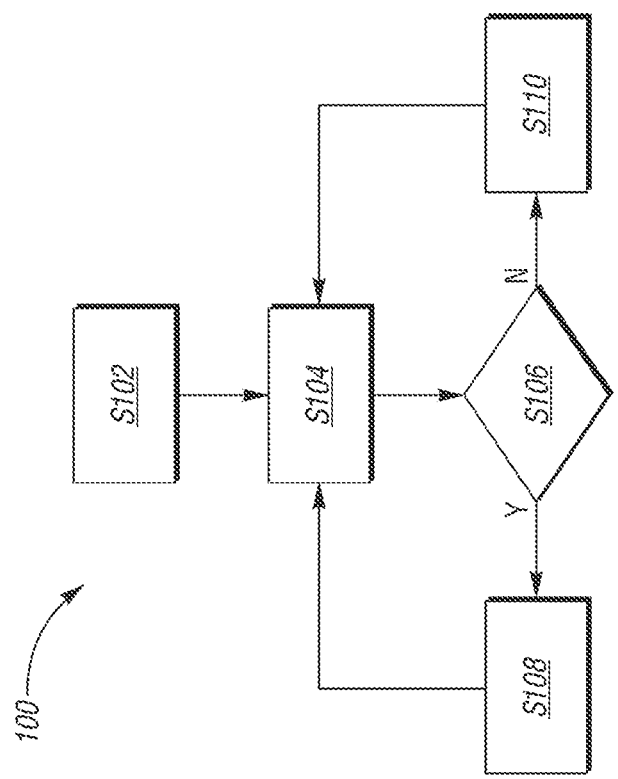
FIG. 4 is a flow chart describing an example method for controlling sound from a prime mover using the system shown in FIG. 1.

FIG. 4 depicts an example embodiment of the method 100 noted above. At step S102, the controller 50 receives the user's sound preferences (arrow 37) for controlling the sound control devices 38 and/or 138 described above. Step S102 may entail using the HMI device 36 of FIG. 1 to display the map 131, and prompting a user to select points of interest on the displayed map 131. The user's sound preferences (arrow 37) may be embodied as the user-designated areas or zones $Z_Q$ and $Z_L$ of the displayed map 131.

Alternatively, with reference to FIG. 5, a user could access a 2D lookup table 70 via the HMI device 36, with the 2D lookup table 70 being indexed by points of interest P1, P2, etc., and by quiet/loud zone $Z_Q$, $Z_L$ designations and predetermined distances (D) to such points of interest, with the user selecting the days and/or times of day corresponding to the particular loud/quiet emanated sound designations. For example, a point of interest P1 may correspond to "all schools", or to a particular school, with the user entering "7:00 am to 3:30 pm, Monday-Friday (M-F)" for the designated "quiet zone", with a distance "D" of 1 mile around the points of interest.

A different point of interest P2 may correspond to vehicle dealerships or other high-performance vehicles, and may be with the user entering "Sunday-Saturday (Su-Sa)" or "all" for the designated "loud zone", with a distance "D" of 0.25 miles around such a point of interest. The user could also use the 2D lookup table 70 to set up other rules such as a rule for conflict resolution, e.g., by having quiet zones take priority over loud zones in the event such zones overlap, for instance by not increasing the sound level when driving through a school zone even if another high-performance vehicle is encountered in the school zone while in the "peacock" or "show" mode described above. The method 100 proceeds to step S104 in FIG. 4 once the controller 50 has been programmed with the user's entered preferences for controlling the sound control devices 38 and/or 138.

Step S104 entails determining the actual location of the vehicle 10 and the actual date/time of day using data from the GPS receiver 31, the clock 52, and the calendar 54 of FIG. 1, respectively. Step S104 may optionally include receiving the communication signal 17W and/or 35 of FIG. 1 depending on the embodiment. The method 100 then proceeds to step S106.

At step S106, the controller 50 determines if the actual location, date, and/or time of day from step S104 corresponds to a location, date, or time of day as previously entered at step S102 as the sound preferences (arrow 37) for controlling the sound control devices 38 and/or 138. Step S106 may optionally include detecting the communication signal 17W and/or 35 as an identification signal, and determining if the identification signal matches a predetermined identification signal. The method 100 proceeds to step S108 when the controller 50 determines that the user sound preference for a loud zone is active, and to step S110 when the controller 50 determines that the sound preference is for a quiet zone.

Step S108 includes transmitting the control signals (arrows 60, 160) of FIG. 1 to the engine noise control device 38 and/or 138 to thereby increase the sound level from the prime mover 12, and then returns to step S104.

Step S110 includes transmitting the control signals (arrows 60, 160) of FIG. 1 to the sound control device 38 and/or 138 to thereby decrease the sound level from the prime mover 12, and then returns to step S104.

To further enhance the functionality of the controller 50 shown in FIG. 1, the controller 50 may be programmed to adaptively learn a particular user's sound preferences (arrow 37) rather than having the user manually select the sound preferences (arrow 37) each time. In an embodiment having only a sport/track or loud mode and a quiet "eco" mode, for instance, with the driver able to manually select the desired mode via the HMI device 36 when in proximity to a point of interest, the controller 50 may determine, after a set number of instances, that a particular point of interest such as "school" should always correspond to "quiet mode", such that the user does not always have to manually select operation in quiet mode each time the vehicle 10 passes another similar point of interest. Likewise, if a given vehicle 10 has two primary users, the sound preferences of the two users may vary. In such a case, the controller 50 may identify the user, e.g., via the user's key fob or other suitable methods, and then observe the user's selected preferences over time in order to build a history for that particular user. In this manner, the system 13 of FIG. 1 may be adaptive, and may automatically control the sound control devices 38 and 138 in accordance with the unique demonstrated preferences of a given user of the vehicle 10.

In still other embodiments, the controller 50 of FIG. 1 may present, via the HMI device 36, a slide bar or other suitable range indicia allowing the user to select a relative degree of sound control, with the strictest level of sound control corresponding to enforcement of quiet operation at all times and the most liberal level of sound control corresponding to loud operation at all times, with movement toward strict sound control gradually increasing the level of control.

While the best modes for carrying out the disclosure have been described in detail, those familiar with the art to which this disclosure relates will recognize various alternative designs and embodiments for practicing the disclosure within the scope of the appended claims.

The invention claimed is:

1. A system for controlling a sound level of a prime mover that is permitted to emanate from or within a vehicle, the system comprising:
   a global positioning satellite (GPS) receiver operable for receiving a GPS signal;
   a sound control device positioned with respect to the vehicle, wherein the sound control device is operable for selectively increasing or decreasing the sound level in response to a control signal, the sound control device including an exhaust nozzle assembly having a flapper door with an open position and a closed position selected via the control signal to thereby respectively increase or decrease the sound level of the prime mover outside of the vehicle; and
   a controller in communication with the GPS receiver, wherein the controller includes a calendar and a clock, and is programmed to receive the GPS signal via the GPS receiver, determine an actual location of the vehicle using the GPS signal, determine an actual date and time of day using the calendar and the clock, respectively, and transmit the control signal to the sound control device to thereby increase or decrease the sound level using at least one of the actual date, time of day, or location.

2. The system of claim 1, wherein the prime mover is an internal combustion engine.

3. The system of claim 1, wherein the controller is programmed to detect a predetermined point of interest a map, and to reduce the sound level when the actual location of the vehicle is within a calibrated range of the predetermined point of interest.

4. The system of claim 3, wherein the predetermined point of interest is selected from the group consisting of: a school, a church, a hospital, a cemetery, and a residential neighborhood.

5. The system of claim 1, wherein the controller includes a human machine interface (HMI) device operable for receiving a sound preference as an input signal, and wherein the controller is programmed to compare a date, location, and time of day from the user sound preference to the actual date, time of day, or location, and to transmit the control signal only when the date, time of day, or location from the user sound preference matches the actual date, time of day, or location, respectively.

6. The system of claim 1, wherein the sound control device includes a speaker system operable for broadcasting an audio signal, and wherein a volume of the audio signal is controlled via the control signal.

7. The system of claim 1, further comprising an additional receiver operable for receiving a communication signal from a remote device, wherein the controller is further programmed to transmit the control signal to the sound control device in response to receipt of the communication signal by the additional receiver.

8. The system of claim 7, wherein the communication signal is a Bluetooth signal or a Wi-Fi signal.

9. The system of claim 7, wherein the remote device is a cell phone, and the controller is programmed to decrease the sound level when the cell phone is active.

10. The system of claim 7, wherein the remote device is a transmitter operable for transmitting an identification signal as the communication signal, and wherein the controller is programmed to increase the sound level when the identification signal matches a predetermined identification signal.

11. The system of claim 1, wherein the controller includes a human machine interface (HMI) device operable for displaying a map, and wherein the controller is programmed to receive a user sound preference from the HMI device in the form of user-designated areas or zones of the displayed map.

12. A method for controlling a sound level of a prime mover that is permitted to emanate from or within a vehicle, the method comprising:
   receiving a global positioning satellite (GPS) signal via a controller using a GPS receiver;
   determining an actual location of the vehicle using the GPS signal;
   determining an actual date and time of day using a calendar and a clock of the controller; and
   increasing or decreasing the sound level using at least one of the actual date, time of day, or location by transmitting a control signal to a sound control device having an exhaust nozzle assembly to thereby select an open position or a closed position of a flapper door of the exhaust nozzle assembly, wherein the sound control device is operable for selectively increasing or decreasing the sound level of the prime mover in response to the control signal by moving the flapper door to the open position or the closed position, respectively.

13. The method of claim 12, wherein the prime mover is an internal combustion engine.

14. The method of claim 12, further comprising:
   detecting a predetermined point of interest a map; and
   reducing the sound level when the actual location of the vehicle is within a calibrated range of the predetermined point of interest.

15. The method of claim 12, wherein the predetermined point of interest is selected from the group consisting of: a school, a church, a hospital, a cemetery, and a residential neighborhood.

16. The method of claim 12, wherein the controller includes a human machine interface (HMI) device operable for receiving a sound preference as an input signal, further comprising:
   comparing a location, date, and time of day from the sound preference to the actual location, date, and time of day; and
   transmitting the control signal only when the date, time of day, or location from the user sound preference matches the actual date, time of day, or location, respectively.

17. The method of claim 12, wherein the sound control device includes a speaker system operable for broadcasting an audio signal into an interior of the vehicle, and wherein increasing or decreasing the sound level includes selecting a volume of the audio signal using the control signal.

18. The method of claim 12, wherein the system includes an additional receiver operable for receiving a communication signal from a remote device, the method further comprising: transmitting the control signal to the sound control device in response to receipt of the communication signal by the additional receiver.

19. A system for controlling a sound level of a prime mover that is permitted to emanate from or within a vehicle, the system comprising:
   a global positioning satellite (GPS) receiver operable for receiving a GPS signal;
   a sound control device positioned with respect to the vehicle, wherein the sound control device is operable for selectively increasing or decreasing the sound level in response to a control signal; and
   a controller in communication with the GPS receiver, wherein the controller includes a human machine interface device operable for receiving a sound preference as an input signal, a calendar, and a clock, and is programmed to receive the GPS signal via the GPS receiver, determine an actual location of the vehicle using the GPS signal, determine an actual date and time of day using the calendar and the clock, respectively, and transmit the control signal to the sound control device to command an increase or decrease in the sound level of the prime mover only when a date, time of day, or location corresponding to the input signal matches the actual date, time of day, or location, respectively.

* * * * *